United States Patent [19]
Hibler

[11] Patent Number: 5,839,250
[45] Date of Patent: Nov. 24, 1998

[54] EDGE PROTECTOR

[76] Inventor: Stanley A. Hibler, 3286 Stadler Dr., Pickerington, Ohio 43147

[21] Appl. No.: 709,185

[22] Filed: Sep. 6, 1996

[51] Int. Cl.[6] .................................................. E04G 21/00
[52] U.S. Cl. ............................. 52/746.1; 52/255; 428/40
[58] Field of Search ..................... 52/254, 255, 746.1; 156/71; 428/41, 43, 41.7, 41.8, 40

[56] References Cited

U.S. PATENT DOCUMENTS

| | | | |
|---|---|---|---|
| 2,622,656 | 12/1952 | Pinsky | 428/41.7 |
| 3,350,825 | 11/1967 | Rillo | 52/746.1 X |
| 3,560,319 | 2/1971 | Kuhlman | 428/41.7 |
| 4,443,283 | 4/1984 | Sarkisian | 428/41.7 X |
| 4,849,267 | 7/1989 | Ward et al. | 156/71 X |
| 4,884,826 | 12/1989 | Slagsvol | 428/41.7 X |
| 5,626,928 | 5/1997 | Summer | 428/41.7 X |

FOREIGN PATENT DOCUMENTS

| | | | |
|---|---|---|---|
| 2824811 | 12/1978 | Germany | 428/41.7 |

*Primary Examiner*—Creighton Smith
*Attorney, Agent, or Firm*—Mueller and Smith, LPA

[57] ABSTRACT

Broadly, the present invention is directed to an edge protector method and system for protecting an outside corner of a room which corner is formed by two walls. The inventive method for protecting such corner includes supplying a tape wound in roll form which tape is formed from polymeric material (e.g., polycarbonate) in a thickness of about 5 to 15 mils and which is scored. The tape has a front surface and a rear surface which is coated with a pressure sensitive adhesive. Preferably, a release liner is secured to the adhesively-coated side of the tape. Also, preferably, the tape and release liner both are axially scored. The tape is unrolled from the roll with the score in axial alignment with the room corner. Finally, the coated rear surface is pressed on each wall extending from the corner to form a corner edge protector for the corner.

10 Claims, 1 Drawing Sheet

U.S. Patent   Nov. 24, 1998   5,839,250
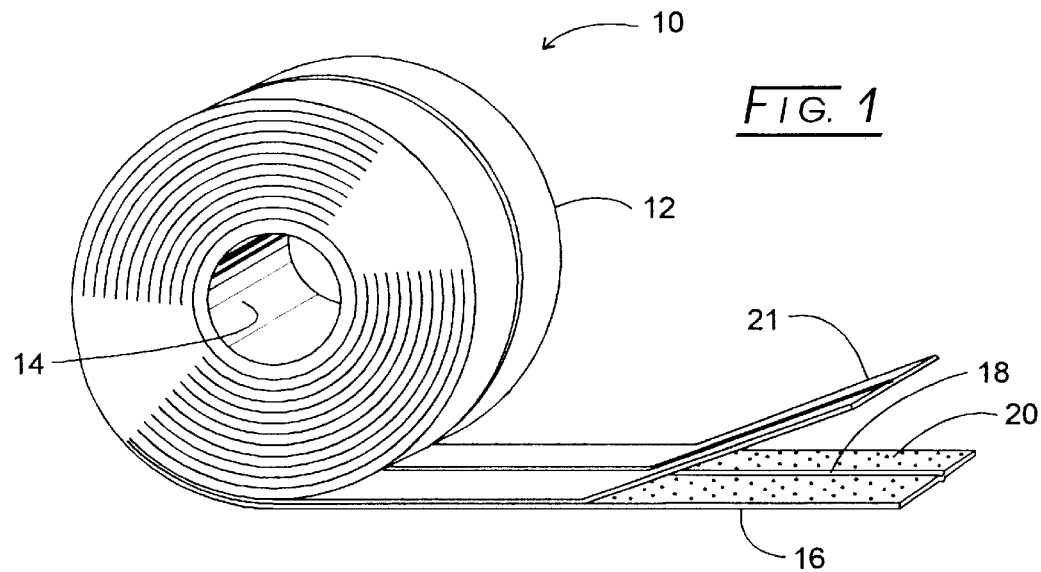
FIG. 1
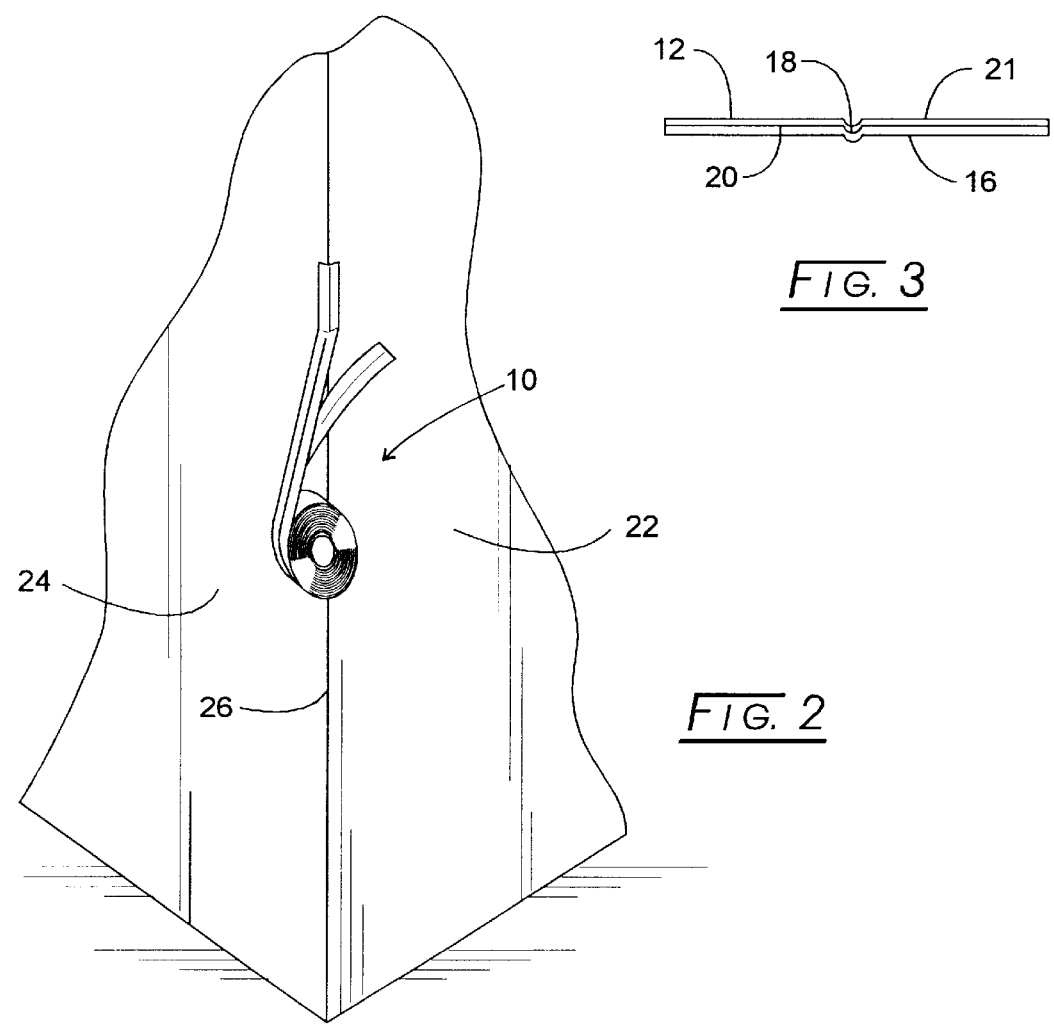
FIG. 3
FIG. 2

EDGE PROTECTOR

BACKGROUND OF THE INVENTION

The present invention relates to providing protection to corners in rooms and more particularly to a tape protector therefor provided in roll or tape form.

Outside corners between rooms and halls often become nicked due to being bumped and scraped by objects passing by and by being bumped by people passing by. Often these objects are being carried, pushed, or pulled by people as they traverse between rooms. Paint and wallpaper at these outside corners become chipped and torn as a result of being bumped and scraped. This is true whether the outside corners are located in a residence or a commercial establishment.

As a result, resort is made to the use of "corner guards" which are rigid, V-shaped transparent plastic protectors that often come in 4 or 8 foot lengths and can be cut to shorter lengths with a saw. These rigid corner guards are attached by nails which can be driven through the rigid plastic into the one or both of the wall sections that form the outside corner for which protection is desired.

Unfortunately, such rigid corner guards often are regarded as unsightly and can be objectionable to a finely-appointed residence. Moreover, nail holes remain in the walls when the corner guards are removed. In fact, removal of such rigid corner guards often results in their being cracked or broken, so that they cannot be reused. Often, these rigid corner guards can become loosened when an object carried past them catches on an edge of the corner guard. More recently, a thin strip of adhesive has been applied to the backs of the rigid corner guards to secure them to the wall corners.

Consequently, there appears to be a need for an outside corner edge protector that is easy to install and is relatively thin.

SUMMARY OF THE INVENTION

Broadly, the present invention is directed to an edge protector method and system for protecting an outside corner, e.g., of a room which corner is formed by two walls. While ordinarily such corner is inside a structure, such as a house or apartment, the corner can be located outside as well. Such corners can be square, rounded, or of another configuration.

The inventive method for protecting such corner includes supplying a tape wound in roll form which tape is formed from polymeric material (e.g., polycarbonate) in a thickness of about 5 to 15 mils and which is scored. The tape has a front surface and a rear surface which rear surface is coated with a pressure sensitive adhesive (PSA). The tape is unrolled from the roll with the score in axial (vertical) alignment with the room corner. Finally, the coated rear surface is pressed on each wall extending from the corner to form a corner edge protector for the corner. The coated rear surface may be pressed on each adjacent wall simultaneously with the axial alignment of the score with the corner or subsequent thereto. The tape optionally may be cut to length or multiple pieces of tape may be placed in edge abutting relationship to extend a desired length along the corner. While the tape preferably is transparent, it also may be colored to match (or contrast) with the adjacent walls which may be painted, wall covered, or subject to other treatment.

Advantages of the present invention include a system for protecting outside corners which is easy to install. A further advantage is an edge protector system that does not damage the adjacent walls during its installation. These and other advantages will become readily apparent to those skilled in the art based on the instant disclosure.

BRIEF DESCRIPTION OF THE DRAWINGS

FIG. 1 is a perspective view of a roll of the pressure-sensitive adhesive coated, scored edge protector tape wound convolutely about a central core with an end portion of the tape being unwound;

FIG. 2 is a simplified perspective view of an outside corner formed by the meeting of two adjacent walls with a roll of the inventive PSA scored tape being unwound to form an edge protector for the corner; and FIG. 3 is an end view of the scored tape with a release liner adhered to the adhesive side of the tape.

The drawings will be described in detail below.

DETAILED DESCRIPTION OF THE INVENTION

As illustrated in FIG. 1, roll 10 is formed by winding tape 12 about core 14. Alternatively, tape 12 can be wound about a mandrel which can be removed so that no core is required. End 16 is seen extending from roll 10 and is seen to have score 18 running axially its length with an inner side of end 16 (and tape 12) being coated with PSA 20. While the outer surface of tape 12 can serve as the release liner for the PSA coated inner surface of tape 12, the construction of roll 10 depicted at FIG. 1 utilizes release liner 21 which is secured to PSA 20 and removed during installation of tape 12 to an outside corner.

Tape 12 is formed from polymeric material which can be acrylic, polyvinyl chloride, polycarbonate, polyethylene, polypropylene, EPDM, polysulfone, polyacrylonitrile, polystyrene, ABS, and the like, and copolymers from monomers thereof. Desirably, the polymeric material used in forming tape 12 will be tough and resist tearing when bumped or scraped after its installation on an outside room corner. The tape additionally should provide a degree of protection to the underlying wall which should also not become cracked or deformed when the adjacent walls forming the corner are bumped. Thinness also is very desirable for tape 12 while providing the protection listed above. The polymeric material also should be scorable, accept a PSA coating, and be inexpensive. The polymeric material optionally can be fiber reinforced in conventional fashion for manufacturing an edge protector of superior strength. The polymeric material preferred considering these competing considerations is polycarbonate in a thickness of about 5 to 15 mils (0.125–0.375 mm), cost being an important factor in this selection. The tape has a preferred nominal width of about 1 inch, though this dimension can vary from about 0.5 inch upwards to 2 inches or more.

A variety of commercial PSA's can be useful for present purposes. The PSA can be cast from organic solvent or from water and can be air cured or heat cured. Of importance is that the PSA provide good adherence of tape 12 to both painted walls as well as wallcovered walls. Presently, a hot melt adhesive is preferred for application to tape 12. As stated above, a variety of commercial PSA adhesives meet these diverse criteria.

Scoring of tape 12 also is accomplished in conventional fashion either during the manufacturing process for making tape 12, or thereafter by use of a knife, tool, or die. The side of the tape 12 to be coated preferably is scored to aid the installer in axially aligning the center (or other location) of tape 12 with the outside corner. Cosmetics, if not functionality, dictate that the edges of tape 12 remain substantially parallel with the corner. Score 18 materially aids in accomplishing this purpose. In this regard, the instant edge protector system is ideally suited for the do-it-yourselfer or homeowner to install. Score 18 surely aids the amateur installer. As illustrated in FIG. 3, scoring of tape 12 provides a forced memory to the tape so that it retains the axial score for use in subsequent installation on a corner.

Further in this regard, reference is made to FIG. 2 which depicts walls 22 and 24 which form outside corner 26 which most often will be inside a building (residence, apartment, commercial building, etc.). Installation of tape 12 from roll 10 involves aligning end 16 at the top or bottom of corner 26 followed by unrolling roll 10 while keeping score 18 in axial alignment with corner 26. Tape 12 can be pressed down to adhere to walls 22 and 24 simultaneously, or the installer can press one side on the tape to one of the walls, e.g., wall 22, and then go back and press tape 12 down onto the other wall, e.g., wall 24. Tape 12 can be cut readily with a scissors or knife. If the installer runs out of tape before covering all of corner 26, a new roll can be opened and its outer end abutted against tape 12 already installed to complete the installation procedure. Again, a facile edge protector system ideally suited for the homeowner has been revealed.

Presently, it is preferred to provide the inventive tape with a scored release liner so that, during installation, one side of the liner can be peeled, the tape aligned with the corner, and then the second side of the liner peeled and pressed on. In this regard, it also is preferred to cut the tape to length before unpeeling any liner.

Besides protecting the substrate forming the corner (e.g., wall board) and any coating applied thereto (e.g., a latex, oil-based, or other paint), the novel edge protector keeps wallcovering edges from peeling or being accidentally pried loosed from the walls.

I claim:

1. A method for protecting an outside corner which is formed by two walls, which comprises:

(a) supplying a tape wound in roll form which tape is formed from polymeric material in a thickness of about 5 to 15 mils and which is axially scored, the tape having a front surface and a rear surface which is coated with a pressure sensitive adhesive;

(b) unrolling said tape from said roll with the score in axial alignment with the outside corner; and (c) pressing said coated rear surface on each wall extending from the corner to form a corner edge protector on said corner.

2. The method of claim 1, wherein a release liner is affixed to the rear surface of said tape.

3. The method of claim 2, wherein said release liner is scored in axial alignment with the tape score.

4. The method of claim 1, wherein said score axially bisects said tape.

5. The method of claim 3, wherein said score axially bisects said tape.

6. The method of claim 1, wherein said pressure sensitive adhesive is a hot melt adhesive.

7. The method of claim 1, wherein said tape is about 1 inch in width.

8. The method of claim 1, wherein said tape is formed from polycarbonate.

9. The method of claim 1, wherein said tape is translucent.

10. The method of claim 1, wherein said tape is pigmented.

* * * * *